(12) United States Patent
Blondel et al.

(10) Patent No.: US 7,388,048 B2
(45) Date of Patent: Jun. 17, 2008

(54) FLEXIBLE SEMIAROMATIC POLYAMIDES WITH A LOW MOISTURE UPTAKE

(75) Inventors: Philippe Blondel, Bernay (FR); Thierry Briffaud, Bernay (FR); Annett Linemann, Bernay (FR); Helene Egret, Rouen (FR); Pierre Nogues, Bernay (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 10/909,503

(22) Filed: Aug. 2, 2004

(65) Prior Publication Data

US 2005/0096430 A1 May 5, 2005

Related U.S. Application Data

(60) Provisional application No. 60/523,480, filed on Nov. 19, 2003.

(30) Foreign Application Priority Data

Aug. 5, 2003 (FR) .................. 03 09641
Jan. 30, 2004 (FR) .................. 04 00906

(51) Int. Cl.
*C08G 69/10* (2006.01)
*C08G 69/14* (2006.01)
*C08G 69/26* (2006.01)

(52) U.S. Cl. .................. 524/538; 428/474.4; 528/310; 528/323; 528/324; 528/325; 528/326; 528/329.1; 528/331; 528/335; 528/339

(58) Field of Classification Search .............. 528/538, 528/310, 323, 324, 325, 326, 329.1, 331, 528/335, 339; 428/474.4
See application file for complete search history.

(56) References Cited

U.S. PATENT DOCUMENTS 3,790,423 A * 2/1974 Jones ................. 156/331.9
3,843,611 A   10/1974 Campbell
4,232,145 A   11/1980 Schmid et al.
4,607,073 A * 8/1986 Sakashita et al. ........... 524/404
5,079,339 A * 1/1992 Akkapeddi et al. ......... 528/347
5,310,860 A   5/1994 Maj et al.
5,418,068 A * 5/1995 Caluori et al. ........... 428/474.4
5,422,418 A   6/1995 Maj et al.
5,708,125 A   1/1998 Liedloff et al.
6,025,423 A   2/2000 Breant
6,149,836 A   11/2000 Mumcu et al.

FOREIGN PATENT DOCUMENTS

JP        2001247673        9/2001

* cited by examiner

*Primary Examiner*—Ana L Woodward
(74) *Attorney, Agent, or Firm*—Thomas F. Roland

(57) ABSTRACT

The present invention relates to a flexible semiaromatic polyamide composition with a low moisture uptake comprising, by weight, the total being 100:

60 to 99.5% (preferably 70 to 93%) of at least one copolyamide of formula X/Y,Ar in
which:
Y denotes the residues of an aliphatic diamine having from 8 to 20 carbon atoms,
Ar denotes the residues of an aromatic dicarboxylic acid,
X denotes either the residues of aminoundecanoic acid $NH_2—(CH_2)_{10}—COOH$, of lactam-12 or of the corresponding amino acid, or X denotes the unit Y,x, residue from the condensation of the diamine with an aliphatic diacid (x) having between 8 and 20 carbon atoms, or X denotes the unit Y,I, residue from the condensation of the diamine with isophthalic acid,
−0.5 to 40% (preferably 7 to 30%) of at least one product chosen from plasticizers, nanofillers, polyolefins, crosslinked polyolefins and additives.

8 Claims, No Drawings

FLEXIBLE SEMIAROMATIC POLYAMIDES WITH A LOW MOISTURE UPTAKE

This application claims benefit, under U.S.C. §119(a) of French National Applications Number 03.09641, filed Aug. 5, 2003, and 04.00906, filed Jan. 30, 2004; and also claims benefit, under U.S.C. §119(e) of U.S. provisional application 60/523,480, filed Nov. 19, 2003.

FIELD OF THE INVENTION

The present invention relates to flexible semiaromatic polyamides with a low moisture uptake. These polyamides also have good elongation properties. These polyamides have a high thermomechanical strength. Polyamide-6 and polyamide-6,6 have high melting points but their conversion is difficult and, furthermore, their water uptake is too high, which is damaging to their mechanical properties and to their resistance to ageing. Furthermore, they are too rigid to be used as pipes; it is then necessary to render them flexible with plasticizers or impact modifiers. All the properties are then lost. Polyamide-12 and polyamide-11 are much used in the automobile industry because of their noteworthy mechanical properties, their ease of use and their resistance to ageing. However, their thermomechanical strength is inadequate beyond a working temperature of 160° C. The invention relates to polyamides which are to replace polyamide-12 and polyamide-11 but which have an improved thermomechanical strength while retaining their ease of conversion and their flexibility.

BACKGROUND OF THE INVENTION

There exist terephthalic copolyamides based on a 6 unit (for example, 6,6/6,T or 6/6,T or also 6,I/6,T, comprising predominantly 6,T) which have very high melting points, above 300° C. These products are very rigid and their elongation at break is less than 10%, which prevents them from being used in the field of extrusion of pipes. Patent EP 550 314 gives examples of copolyamides-12/6,T. U.S. Pat. No. 3,843,611 discloses copolyamides-12,12/12,T. U.S. Pat. No. 5,708,125 discloses copolyamides-10,6/10,T. None of these prior arts discloses a possible aptitude with regard to ageing. Furthermore, none of these prior arts discloses the need for flexible polyamides. The aim of the present invention is to find polyamides which have resistance to ageing when they are subjected to a high working temperature, while remaining flexible. Such compositions have now been found.

SUMMARY OF THE INVENTION

The present invention relates to a composition comprising, by weight, the total being 100:
  60 to 99.5% (preferably 70 to 93%) of at least one copolyamide of formula X/Y,Ar in which:
    Y denotes the residues of an aliphatic diamine having from 8 to 20 carbon atoms,
    Ar denotes the residues of an aromatic dicarboxylic acid,
    X denotes either the residues of aminoundecanoic acid $NH_2-(CH_2)_{10}-COOH$, of lactam-12 or of the corresponding amino acid, or X denotes the unit Y,x, residue from the condensation of the diamine with an aliphatic diacid (x) having between 8 and 20 carbon atoms, or X denotes the unit Y,I, residue from the condensation of the diamine with isophthalic acid,
  0.5 to 40% (preferably 7 to 30%) of at least one product chosen from plasticizers, nanofillers, polyolefins, crosslinked polyolefins and additives.

The intrinsic viscosity of the copolyamide is advantageously between 0.5 and 2 and preferably between 0.8 and 1.8.

The advantage of these compositions is the low water uptake, which does not exceed 3% by weight.

Preferably, X/Y, Ar denotes:
  11/10,T, which results from the condensation of aminoundecanoic acid, 1,10-decanediamine and terephthalic acid,
  12/12,T, which results from the condensation of lactam-12, 1,12-dodecanediamine and terephthalic acid,
  10,10/10,T, which results from the condensation of sebacic acid, 1,10-decanediamine and terephthalic acid,
  10,I/10,T, which results from the condensation of isophthalic acid, 1,10-decanediamine and terephthalic acid.

The present invention also relates to structures comprising a layer composed of the above composition. This structure is of use in preparing devices for the storage or transfer of fluids, in particular in automobiles. The invention also relates to these devices. These devices can be tanks, pipes or containers. These structures can comprise other layers composed of other materials.

The compositions of the invention can replace rubbers or metals.

The compositions of the invention are also of use as materials for electrical cables and can replace fluoropolymers.

The compositions of the invention are of use as materials for formulations comprising fillers: e.g. magnetic fillers. The compositions of the invention then act as binder for fillers of this type.

DESCRIPTION OF THE INVENTION

As regards the aromatic diacid, mention may be made of terephthalic acid, isophthalic acid, bibenzoic acid, naphthalenedicarboxylic acid, 4,4'-biphenyldicarboxylic acid, bis(p-carboxyphenyl)methane, ethylenebis(p-benzoic acid), 1,4-tetramethylenebis(p-oxybenzoic acid), ethylenebis(para-oxybenzoic acid) or 1,3-trimethylenebis(p-oxybenzoic acid). Preferably, this is terephthalic acid; it is denoted by "T".

As regards "Y", the diamine can be an α,ω-diamine comprising a straight chain. It preferably has from 9 to 14 carbon atoms. According to a preferred form, this is 1,10-decanediamine. It can be branched or can be a mixture of a linear (straight-chain) diamine and of a branched diamine.

As regards "X", and more particularly "x" in "Y,x", this is advantageously an aliphatic α,ω-diacid comprising a straight chain. It preferably has between 9 and 14 carbon atoms.

As regards the proportions of X, Y and Ar, Y and Ar are in stoichiometric proportions or proportions very close to stoichiometric.

There is advantageously between 0.5 and 0.7 mol of X per 1 mol of Y (or one mole of Ar).

0.5 mol of X also means 0.5 mol of Y,x, that is to say 0.5 mol of Y and 0.5 mol of x in the Y,x group. Likewise, 0.5 mol of X also means 0.5 mol of Y,I, that is to say 0.5 mol of Y and 0.5 mol of I in the Y,I group.

If Y comprises a long chain, for example has at least of the order of 15 to 18 carbon atoms, then the proportions of X can be very low, indeed even zero. The copolyamide is reduced to Y,Ar. The invention also relates to the preceding compositions in which X/Y,Ar has become Y,Ar and Y denotes the residues of an aliphatic diamine having from 10 to 20(preferably from 15 to 20 and better still from 18 to 20) carbon atoms.

If X/Y,Ar denotes 10,10/10,T, then the proportions of X can be higher and can be between 0.5 mol per 1 mol of Y and 1 mol per 0.05 mol of Y.

As regards the plasticizer, it is chosen from benzenesulphonamide derivatives, such as n-butylbenzenesulphonamide (BBSA), ethyltoluenesulphonamide or N-cyclohexyltoluenesulphonamide; esters of hydroxybenzoic acids, such as 2-ethylhexyl para-hydroxybenzoate and 2-decylhexyl para-hydroxybenzoate; tetrahydrofurfuryl alcohol esters or ethers, such as oligoethoxylated tetrahydrofurfuryl alcohol; esters of citric acid or of hydroxymalonic acid, such as oligoethoxylated malonate. Mention may also be made of decylhexyl para-hydroxybenzoate and ethylhexyl para-hydroxybenzoate. A particularly preferred plasticizer is n-butylbenzenesulphonamide (BBSA).

As regards the nanofillers, this term is used to denote particles of any shape, at least one of their dimensions being of the order of a nanometre. Advantageously, these are lamellar exfoliable fillers. In particular, the lamellar exfoliable fillers are silicates and in particular organophilic treated clays; these clays, which exist in the form of sheets, are rendered organophilic by insertion between the latter of organic or polymeric molecules and are obtained in particular according to a process as disclosed in U.S. Pat. No. 5,578,672.

Preferably, the clays used are of the smectite type, either of natural origin, such as, in particular, montmorillonites, bentonites, saponites, hectorites, fluorohectorites, beidellites, stibensites, nontronites, stipulgites, attapulgites, illites, vermiculites, halloysites, stevensites, zeolites, fuller's earths and mica, or of synthetic origin, such as permutites.

Mention may be made, by way of example, of the organophilic clays disclosed in U.S. Pat. No. 6,117,932. Preferably, the clay is modified with an organic substance via an ionic bond with an onium ion having 6 carbon atoms or more. If the number of carbon atoms is less than 6, the organic onium ion is too hydrophilic and thus the compatibility with the polymer (the blend of (A) and (B)) may decrease. Mention may be made, as examples of organic onium ion, of hexylammonium ions, octylammonium ions, 2-ethylhexylammonium ions, dodecylammonium ions, laurylammonium ions, octadecylammonium (stearylammonium) ions, dioctyldimethylammonium ions, trioctylammonium ions, distearyldimethylammonium ions, stearyltrimethylammonium ions and ammonium laurate ions. It is recommended to use a clay having the greatest possible contact surface with the polymer. The greater the contact surface, the greater the separation of the clay flakes. The cation exchange capacity of the clay is preferably between 50 and 200 milliequivalents per 100 g. If the capacity is less than 50, the exchange of the onium ions is inadequate and the separation of the clay flakes may be difficult. On the other hand, if the capacity is greater than 200, the bonding strength of the clay flakes to one another is so strong that the separation of the flakes may be difficult. Mention may be made, as examples of clay, of smectite, montmorillonite, saponite, hectorite, beidellite, stibensite, nontronite, vermiculite, halloysite and mica. These clays can be of natural or synthetic origin. The proportion of organic onium ion is advantageously between 0.3 and 3 equivalents of the ion exchange capacity of the clay. If the proportion is less than 0.3, the separation of the clay flakes may be difficult. If the proportion is greater than 3, decomposition of the polymer may occur. The proportion of organic onium ion is preferably between 0.5 and 2 equivalents of the ion exchange capacity of the clays. The nanofillers can be added to the monomers and can be present during the polymerization of the copolyamide or can be added after the polymerization.

As regards the crosslinked polyolefins, this phase can originate (i) from the reaction of two polyolefins having groups which react with one another, (ii) from maleicized polyolefins with a monomeric, oligomeric or polymeric diamino molecule, (iii) or from one (or more) unsaturated polyolefin carrying unsaturation and which can be crosslinked, for example, by the peroxide route. As regards the reaction of two polyolefins, this crosslinked phase originates, for example, from the reaction:

of a product (A) comprising an unsaturated epoxide,
of a product (B) comprising an unsaturated carboxylic acid anhydride,
optionally of a product (C) comprising an unsaturated carboxylic acid or of an α,ω-aminocarboxylic acid.

As regards the crosslinked polyolefins, mention may be made, as example of product (A), of those comprising ethylene and an unsaturated epoxide.

According to a first form of the invention, (A) is either a copolymer of ethylene and of an unsaturated epoxide or a polyolefin grafted by an unsaturated epoxide.

As regards the polyolefin grafted by an unsaturated epoxide, the term "polyolefin" is understood to mean polymers comprising olefin units, such as, for example, ethylene, propylene, 1-butene or all other α-olefin units. Mention may be made, by way of example, of polyethylenes, such as LDPE, HDPE, LLDPE or VLDPE, polypropylene, ethylene/propylene copolymers, EPRs (ethylene/propylene rubber) or metallocene PEs (copolymers obtained by single-site catalysis), styrene/ethylene-butene/styrene (SEBS) block copolymers, styrene/butadiene/styrene (SBS) block copolymers, styrene/isoprene/styrene (SIS) block copolymers, styrene/ethylene-propylene/styrene block copolymers or ethylene/propylene/diene monomer (EPDM) terpolymers;

copolymers of ethylene with at least one product chosen from salts or esters of unsaturated carboxylic acids or vinyl esters of saturated carboxylic acids.

Advantageously, the polyolefin is chosen from LLDPE, VLDPE, polypropylene, ethylene/vinyl acetate copolymers or ethylene/alkyl (meth)acrylate copolymers. The density can advantageously be between 0.86 and 0.965 and the melt flow index (MFI) can be between 0.3 and 40 (in g/10 min at 190° C. under 2.16 kg).

As regards the copolymers of ethylene and of an unsaturated epoxide, mention may be made, for example, of copolymers of ethylene, of an alkyl (meth)acrylate and of an unsaturated epoxide or copolymers of ethylene, of a saturated carboxylic acid vinyl ester and of an unsaturated epoxide. The amount of epoxide can be up to 15% by weight of the copolymer and the amount of ethylene at least 50% by weight.

Advantageously, (A) is a copolymer of ethylene, of an alkyl (meth)acrylate and of an unsaturated epoxide.

Preferably, the alkyl (meth)acrylate is such that the alkyl has 2 to 10 carbon atoms.

The MFI (melt flow index) of (A) can, for example, be between 0.1 and 50 (g/10 min at 190° C. under 2.16 kg).

Examples of alkyl acrylate or methacrylate which can be used are in particular methyl methacrylate, ethyl acrylate, n-butyl acrylate, isobutyl acrylate or 2-ethylhexyl acrylate. Examples of unsaturated epoxides which can be used are in particular:

- aliphatic glycidyl esters and ethers, such as allyl glycidyl ether, vinyl glycidyl ether, glycidyl maleate, glycidyl itaconate, glycidyl acrylate and glycidyl methacrylate, and
- alicyclic glycidyl esters and ethers, such as 2-cyclohexen-1-yl glycidyl ether, diglycidyl cyclohexene-4,5-dicarboxylate, glycidyl cyclohexene-4-carboxylate, glycidyl 5-norbornene-2-methyl-2-carboxylate and diglycidyl endo-cis-bicyclo[2.2.1]hept-5-ene-2,3-dicarboxylate.

According to another form of the invention, the product (A) is a product having two epoxide functional groups, such as, for example, bisphenol A diglycidyl ether (BADGE).

Mention may be made, as examples of product (B), of those comprising ethylene and an unsaturated carboxylic acid anhydride.

(B) is either a copolymer of ethylene and of an unsaturated carboxylic acid anhydride or a polyolefin grafted by an unsaturated carboxylic acid anhydride.

The polyolefin can be chosen from the polyolefins mentioned above which has to be grafted by an unsaturated epoxide.

Examples of unsaturated dicarboxylic acid anhydrides which can be used as constituents of (B) are in particular maleic anhydride, itaconic anhydride, citraconic anhydride and tetrahydrophthalic anhydride.

Mention may be made, as examples, of copolymers of ethylene, of an alkyl (meth)acrylate and of an unsaturated carboxylic acid anhydride and copolymers of ethylene, of a saturated carboxylic acid vinyl ester and of an unsaturated carboxylic acid anhydride.

The amount of unsaturated carboxylic acid anhydride can be up to 15% by weight of the copolymer and the amount of ethylene at least 50% by weight.

Advantageously, (B) is a copolymer of ethylene, of an alkyl (meth)acrylate and of an unsaturated carboxylic acid anhydride. Preferably, the alkyl (meth)acrylate is such that the alkyl has 2 to 10 carbon atoms.

The alkyl (meth)acrylate can be chosen from those mentioned above.

The MFI of (B) can, for example, be between 0.1 and 50 (g/10 min at 190° C. under 2.16 kg).

According to another form of the invention, (B) can be chosen from aliphatic, alicyclic or aromatic polycarboxylic acids or their partial or complete anhydrides.

Mention may be made, as examples of aliphatic acids, of succinic acid, glutaric acid, pimelic acid, azelaic acid, sebacic acid, adipic acid, dodecanedicarboxylic acid, octadecanedicarboxylic acid, dodecenesuccinic acid and butanetetracarboxylic acid.

Mention may be made, as examples of alicyclic acids, of cyclopentanedicarboxylic acid, cyclopentanetricarboxylic acid, cyclopentanetetracarboxylic acid, cyclohexanedicarboxylic acid, cyclohexanetricarboxylic acid, methylcyclopentane-dicarboxylic acid, tetrahydrophthalic acid, endomethylenetetrahydrophthalic acid and methyl-endomethylenetetrahydrophthalic acid.

Mention may be made, as examples of aromatic acids, of phthalic acid, isophthalic acid, terephthalic acid, trimellitic acid, trimesic acid or pyromellitic acid.

Mention may be made, as examples of anhydrides, of the partial or complete anhydrides of the above acids.

Use is advantageously made of adipic acid.

It would not be departing from the scope of the invention if a portion of the copolymer (B) is replaced by an ethylene-acrylic acid copolymer or an ethylene-maleic anhydride copolymer, the maleic anhydride having been completely or partially hydrolysed. These copolymers can also comprise an alkyl (meth)acrylate. This portion can represent up to 30% of (B).

With regard to the product (C) comprising an unsaturated carboxylic acid, mention may be made, as examples, of the products (B) completely or partly hydrolysed. (C) is, for example, a copolymer of ethylene and of an unsaturated carboxylic acid and advantageously a copolymer of ethylene and of (meth)acrylic acid.

Mention may also be made of the copolymers of ethylene, of an alkyl (meth)acrylate and of acrylic acid.

These copolymers have an MFI of between 0.1 and 50 (g/10 min at 190° C. under 2.16 kg).

The amount of acid can be up to 10% by weight and preferably 0.5 to 5%. The amount of (meth)acrylate is from 5 to 40% by weight.

(C) can also be chosen from $\alpha,\omega$-aminocarboxylic acids, such as, for example, $NH_2$—$(CH_2)_5COOH$, $NH_2$—$(CH_2)_{10}$—$COOH$ and $NH_2(CH_2)_{11}$—$COOH$ and preferably aminoundecanoic acid.

The proportion of (A) and (B) necessary to form the crosslinked phase is determined according to the usual rules of the art by the number of reactive functional groups present in (A) and in (B).

For example, in the crosslinked phases comprising (C) chosen from $\alpha,\omega$-aminocarboxylic acids, if (A) is a copolymer of ethylene, of an alkyl (meth)acrylate and of an unsaturated epoxide and (B) a copolymer of ethylene, of an alkyl (meth)acrylate and of an unsaturated carboxylic acid anhydride, the proportions are such that the ratio of the anhydride functional groups to the epoxy functional groups is in the region of 1.

The amount of $\alpha,\omega$-aminocarboxylic acid is then from 0.1 to 3% and preferably 0.5 to 1.5% of (A) and (B).

As regards (C) comprising an unsaturated carboxylic acid, that is to say (C) being chosen, for example, from ethylene/alkyl (meth)acrylate/acrylic acid copolymers, the amount of (C) and (B) can be chosen so that the number of acid functional groups and of anhydride functional groups is at least equal to the number of epoxide functional groups and, advantageously, products (B) and (C) are used such that (C) represents 20 to 80% by weight of (B) and preferably 20 to 50%.

It would not be departing from the scope of the invention if a catalyst were added.

These catalysts are generally used for the reactions between the epoxy groups and the anhydride groups.

Mention may in particular be made, among the compounds capable of accelerating the reaction between the epoxy functional group present in (A) and the anhydride or acid functional group present in (B), of:

- tertiary amines, such as dimethyllaurylamine, dimethylstearylamine, N-butylmorpholine, N,N-dimethylcyclohexylamine, benzyldimethylamine, pyridine, 4-(dimethylamino)pyridine, 1-methylimidazole, tetramethylethylhydrazine, N,N-dimethylpiperazine, N,N,N',N'-tetramethyl-1,6-hexanediamine or a mixture of tertiary amines having from 16 to 18 carbons and known under the name of dimethyltallowamine
- 1,4-diazabicyclo[2.2.2]octane (DABCO)
- tertiary phosphines, such as triphenylphosphine
- zinc alkyldithiocarbamates.

The amount of these catalysts is advantageously from 0.1 to 3% and preferably 0.5 to 1% of (A)+(B)+(C).

As regards the noncrosslinked polyolefins, mention may be made of the polyolefins described in the preceding section and intended to be grafted by reactive groups. Mention may also be made of the products (A) or (B) or (C) of the preceding section but used alone in order not to crosslink. Mention may be made, by way of examples, of the EPR or EPDM elastomers, it being possible for these elastomers to be grafted in order to make it easier to render them compatible with the copolyamide. Mention may also be made of acrylic elastomers, for example those of the NBR, HNBR or X-NBR type.

As regards the preparation of the compositions of the invention, use may be made of any conventional process for the synthesis of polyamides and copolyamides.

The compositions according to the invention can additionally include at least one additive chosen from:

dyes;
pigments;
brighteners;
antioxidants;
flame retardants;
UV stabilizers;
nucleating agents.

The invention claimed is:

1. Composition comprising, by weight, the total being 100:

-60 to 99.5% of at least one copolyamide of formula X/Y,Ar in which there is between 0.5 and 0.7 mol of xper 1 mol of Y, and in which:
  Y denotes the residues of 1,10-decanediamine,
  Ar denotes the residues of terephthalic acid,
  X denotes
    a) the residue of aminoundecanoic acid $NH_2$—$(CH_2)_{10}$—COOH,
    b) the unit Y,I, residue from the condensation of the diamine (Y) with isophthalic acid,
  wherein said composition is a flexible semiaromatic copolyamide; and
-0.5 to 40% of at least one product chosen from plasticizers,
wherein said composition has a low water uptake of 3% or less.

2. Composition according to claim 1, in which the proportion of the copolyamide is from 70 to 93% for 7 to 30% of at least one product chosen from plasticizers.

3. Composition according to claim 1, in which the intrinsic viscosity of the copolyamide is between 0.5 and 2.

4. Composition according to claim 3, in which the intrinsic viscosity of the copolyamide is between 0.8 and 1.8.

5. Composition according to claim 1, in which Y and Ar are in about stoichiometric proportions.

6. Composition according to claim 1 in which X/Y,Ar denotes 11/10,T, which results from the condensation of aminoundecanoic acid, 1,10-decanediamine and terephthalic acid.

7. Structure comprising a layer composed of the composition according to claim 1.

8. Formulation comprising fillers and binder wherein said binder comprises the composition according to claim 1.

* * * * *